United States Patent
Lopez, Jr. et al.

(10) Patent No.: US 10,249,941 B2
(45) Date of Patent: Apr. 2, 2019

(54) RADAR SYSTEM FOR A MOTOR VEHICLE

(71) Applicant: FORD GLOBAL TECHNOLOGIES, LLC, Dearborn, MI (US)

(72) Inventors: Martin D. Lopez, Jr., Sterling Heights, MI (US); Robert Harold Vasbinder, Dundee, MI (US); Michael Jon Gutowski, Saline, MI (US); Matthew Dennis Smith Boswell, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 15/489,339

(22) Filed: Apr. 17, 2017

(65) Prior Publication Data
US 2018/0301795 A1    Oct. 18, 2018

(51) Int. Cl.
*H01Q 1/32* (2006.01)
*H01Q 3/04* (2006.01)
*G01S 13/93* (2006.01)

(52) U.S. Cl.
CPC ......... *H01Q 1/3233* (2013.01); *H01Q 1/3283* (2013.01); *H01Q 3/04* (2013.01); *G01S 13/931* (2013.01); *G01S 2013/9314* (2013.01); *G01S 2013/9325* (2013.01); *G01S 2013/9346* (2013.01); *G01S 2013/9375* (2013.01); *G01S 2013/9378* (2013.01)

(58) Field of Classification Search
CPC ...... H01Q 1/3233; H01Q 3/04; H01Q 1/3283; H01Q 1/32; H01Q 1/12; G01S 13/931; G01S 2013/9378; G01S 2013/9375; G01S 2013/9346; G01S 2013/9314; G01S 2013/9325; G01S 13/93
USPC ....................................................... 343/714
See application file for complete search history.

(56) References Cited

U.S. PATENT DOCUMENTS

| | | | |
|---|---|---|---|
| 6,667,722 B1 | 12/2003 | Schmidt et al. | |
| 7,183,989 B2 * | 2/2007 | Tietjen ...................... | G01S 7/03 343/757 |
| 2015/0198698 A1 | 7/2015 | Wehling et al. | |

FOREIGN PATENT DOCUMENTS

| | | |
|---|---|---|
| CN | 203930055 U | 11/2014 |
| CN | 205089746 U | 3/2016 |
| FR | 2578687 A1 | 6/1988 |
| RU | 2335673 C1 | 10/2008 |

OTHER PUBLICATIONS

English Machine Translation of CN203930055U.
English Machine Translation of CN205089746U.
English Machine Translation of FR2578687A1.
English Machine Translation of RU2335673C1.

* cited by examiner

*Primary Examiner* — Jean B Jeanglaude
(74) *Attorney, Agent, or Firm* — Jason Rogers; Vichit Chea; King & Schickli, PLLC

(57) ABSTRACT

A radar system for a motor vehicle includes a mounting bracket and a radar support bracket carried on the mounting bracket. The radar support bracket is displaceable between a deployed position and a deflected position. A biasing element biases the radar support toward the deployed position. A radar module is carried on the radar support bracket.

16 Claims, 4 Drawing Sheets

RADAR SYSTEM FOR A MOTOR VEHICLE

TECHNICAL FIELD

This document relates generally to the motor vehicle equipment field and, more particularly, to a new and improved radar system for a motor vehicle that incorporates a mounting feature that protects the radar module of the radar system and the radar support bracket upon which the radar module is mounted from low speed impact damage.

BACKGROUND

Many modern motor vehicles are fitted with radar systems for detecting objects and the positions of those objects relative to the motor vehicle. There are both rearward facing and forward facing radar systems. Forward facing radar systems are becoming increasingly popular. Such forward facing radar systems are multi-functional and may be used to provide parking assistance, adaptive cruise control and pre-crash braking features and the like.

Packaging the radar at the front of a motor vehicle creates a number of difficulties for the designer. Such packaging is a challenging mixture of often conflicting requirements for optimum radar functionality, proper motor vehicle cooling, best aerodynamics and desired styling. In many instances the radar module and radar support bracket holding the radar module are positioned adjacent flexible components of the front fascia of the motor vehicle. Such components may be deflected by relatively low impact forces into engagement with the radar module and/or the radar module support bracket with the resulting impact force placing a stress on the radar module or radar support bracket which causes damage or misalignment of the radar system.

This document relates to a new and improved radar system for a motor vehicle that protects the radar module and radar support bracket from impact forces associated with a relatively low speed (less than 5 miles per hour) impacts.

SUMMARY

In accordance with the purposes and benefits described herein, a radar system is provided for a motor vehicle. That radar system comprises a mounting bracket and a radar support bracket carried on the mounting bracket. The radar support bracket is displaceable between a deployed position and a deflected position. The radar system further includes a biasing element for biasing the radar support bracket toward the deployed position. In addition, the radar system includes a radar module carried on the radar support bracket.

The mounting bracket may include a pivot rod. The radar support bracket may include a first lug and a second lug that are rotatably received on the pivot rod.

The biasing element may be a torsion spring. That torsion spring may be received over the pivot rod. Further, that torsion spring may have a first end connected to the mounting bracket and a second end connected to the radar support bracket. More specifically, the first end of the torsion spring may be connected to the pivot rod and the second end of the torsion spring may be connected to the first lug.

Still further, the mounting bracket may include a mounting plate, a first leg and a second leg. The first leg and the second leg may extend between the mounting plate and the pivot rod.

In accordance with an additional aspect, a method is provided of protecting a radar module during an impact and, more particularly, a low speed impact of less than approximately 5 miles per hour. That method may comprise the step of displacing the radar module from a deployed position to a deflected position in response to an impact force created by the impact.

In addition the method may include the step of biasing the radar module toward the deployed position with a biasing element. Further, the method may include the step of pivoting the radar module against the biasing element in response to the impact force. In addition, the method may include the step of biasing the radar module back into the deployed position with the biasing element following application of the impact force.

The method may also include the step of carrying the radar module on a radar support bracket. In addition, the method may include the step of pivotally mounting the radar support bracket to a mounting bracket as well as the step of securing that mounting bracket to a support structure of the motor vehicle.

In accordance with yet another aspect, a motor vehicle is provided that is equipped with the radar system. The mounting bracket of that radar system may be fixed to a support structure of the motor vehicle.

In the following description, there are shown and described several preferred embodiments of the radar system, the related method of protecting a radar module during an impact and a motor vehicle equipped with the radar system. As it should be realized, the radar system, method and motor vehicle are capable of other, different embodiments and their several details are capable of modification in various, obvious aspects all without departing from the radar system, method and motor vehicle as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the radar system, method and motor vehicle and together with the description serve to explain certain principles thereof.

Reference will now be made in detail to the present preferred embodiments of the radar system, examples of which are illustrated in the accompanying drawing figures.

DETAILED DESCRIPTION

Figure 1:
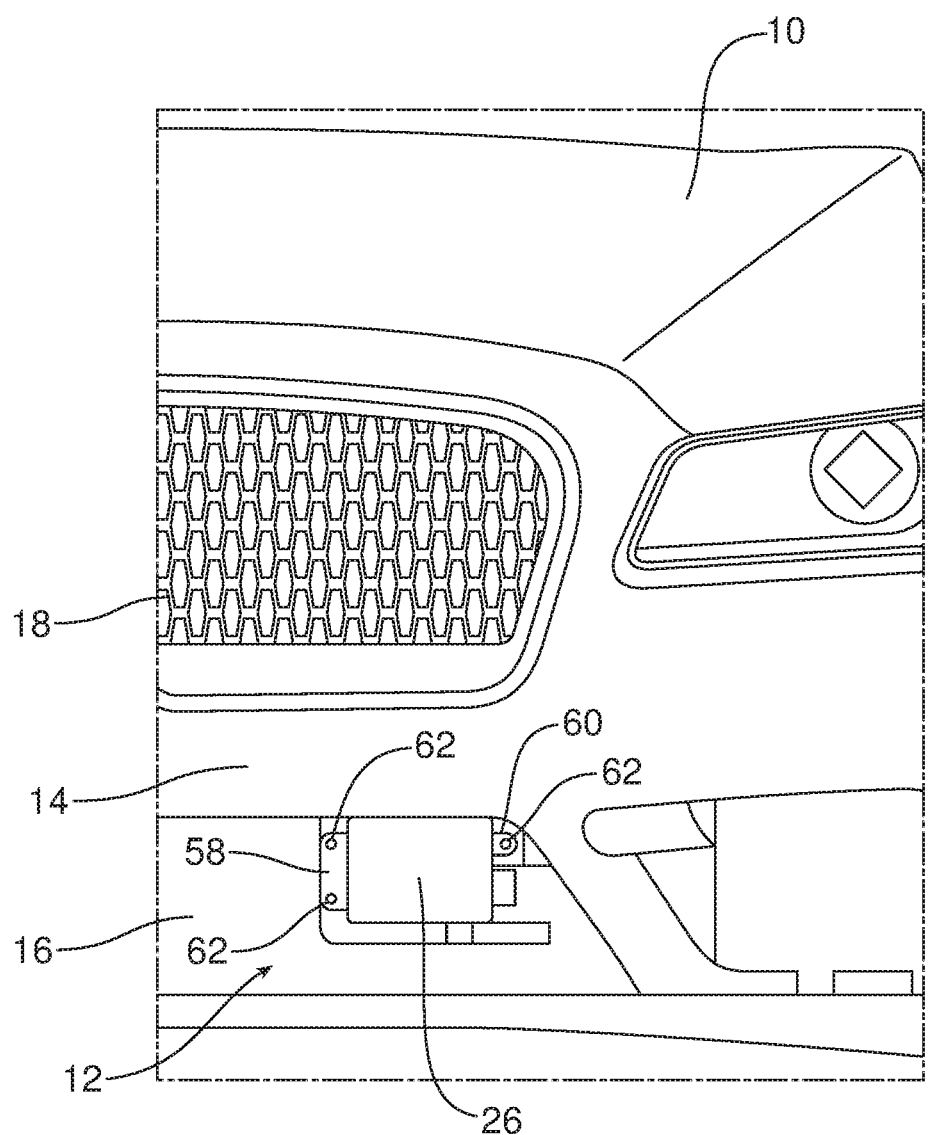
FIG. 1 is a front elevational view of a motor vehicle illustrating the mounting position of a forward facing radar module on the motor vehicle adjacent the flexible front fascia of the motor vehicle.

Reference is now made to FIG. 1 illustrating a motor vehicle 10 equipped with a new and improved radar system 12. In the illustrated embodiment, the radar system 12 is a forward facing radar system located adjacent the flexible front fascia 14 of the motor vehicle 10 in the air intake 16 below the grille 18.

Figure 2:
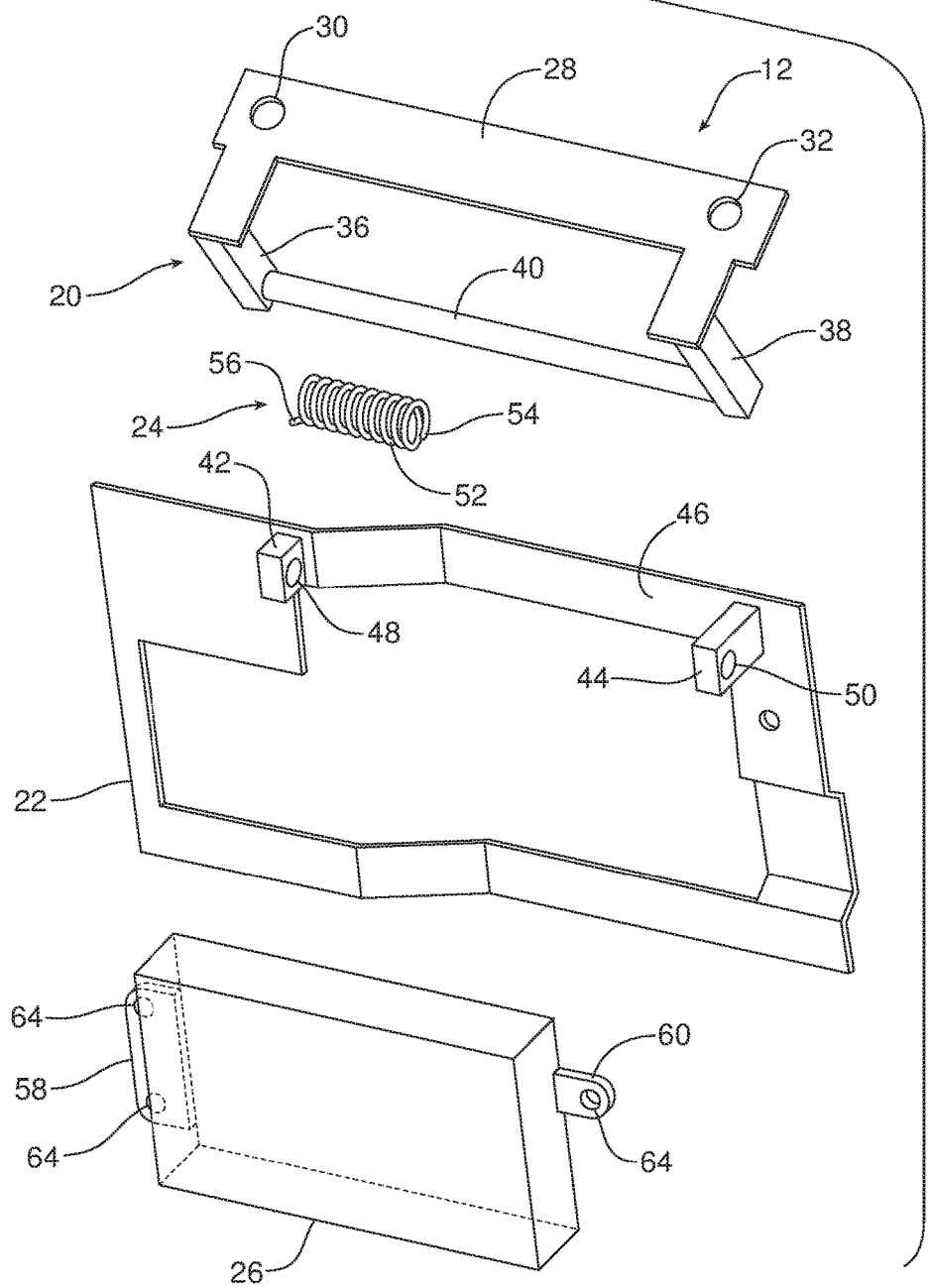
FIG. 2 is an exploded perspective view of the radar system including the mounting bracket, radar support bracket, biasing element and radar module.
Figure 3:
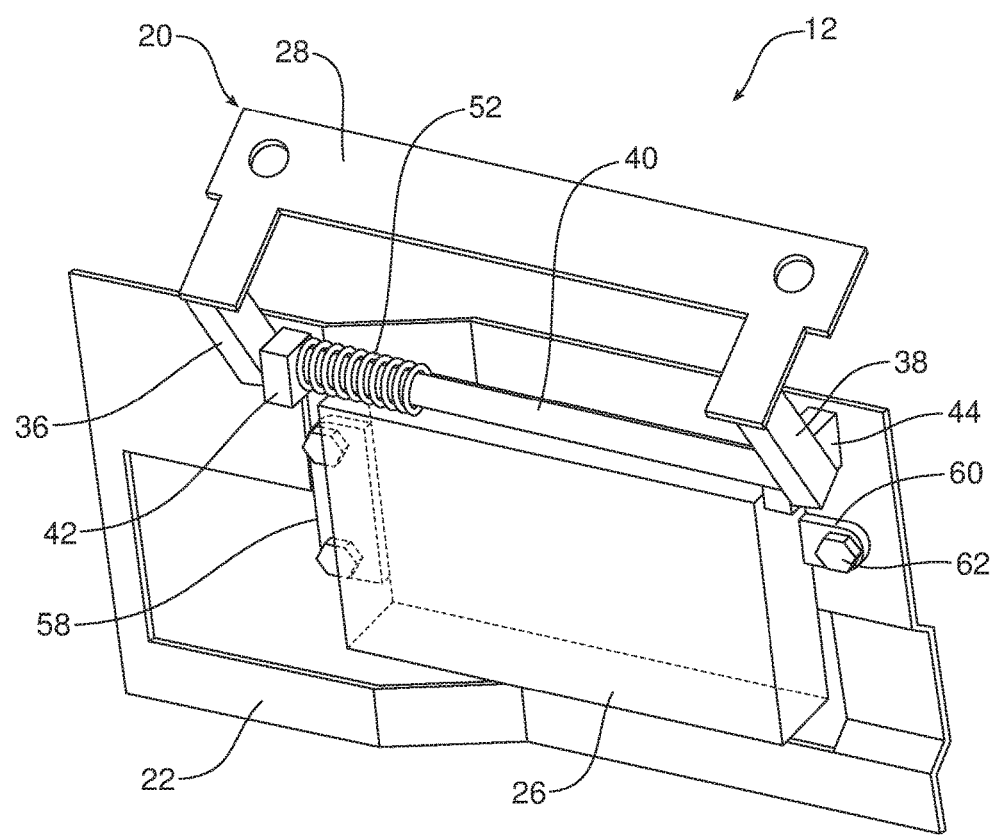
FIG. 3 is a perspective view of the assembled radar system.

As illustrated in FIGS. 1-3, the radar system 12 includes a mounting bracket 20, a radar support bracket 22, a biasing element 24 and a radar module 26 which includes electronics for detecting objects and their positions relative to the motor vehicle 10.

Figure 4:
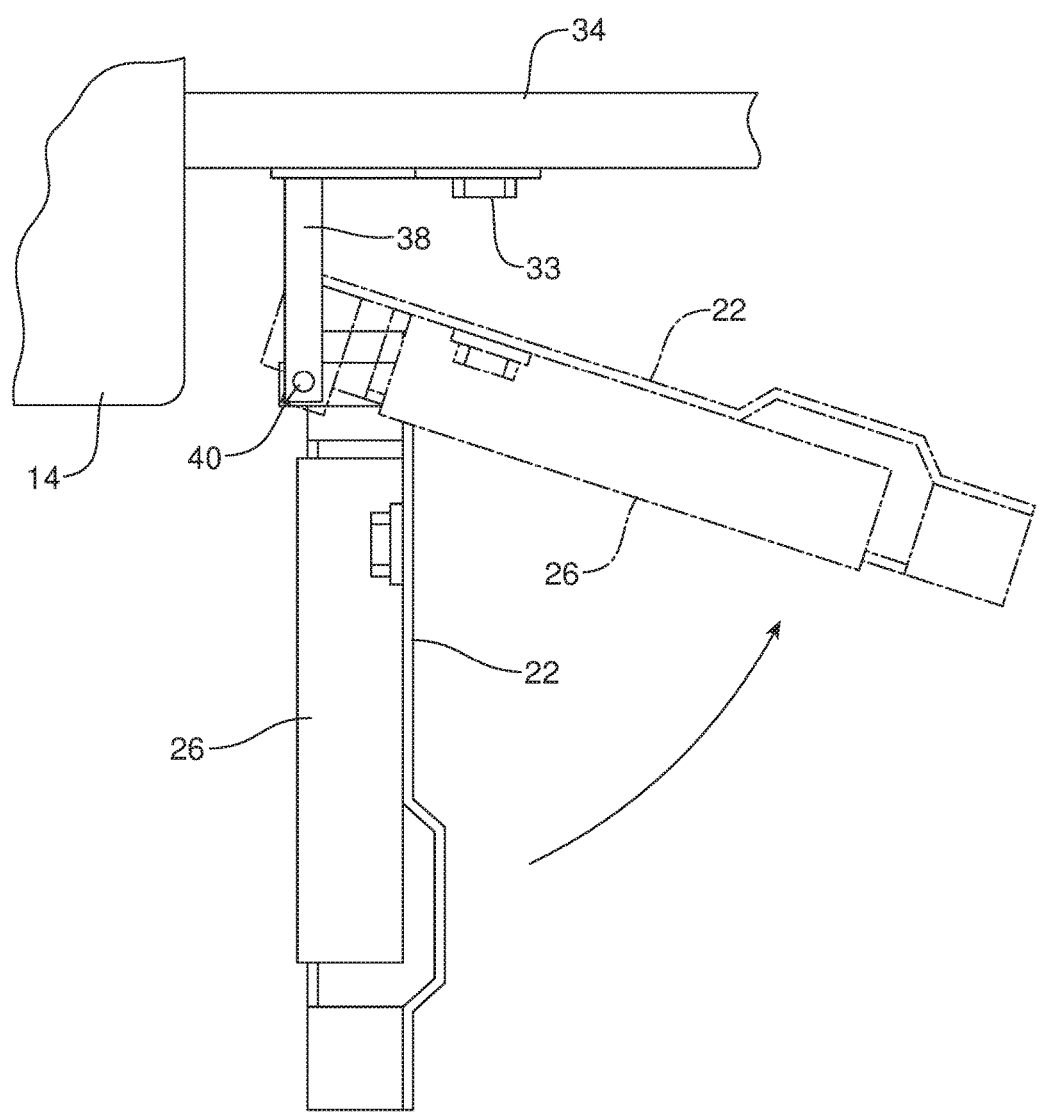
FIG. 4 is a schematic side elevational view illustrating the displacement of the radar support bracket and radar module carried thereon from the deployed position to the deflected position.

In the illustrated embodiment, the mounting bracket 20 includes a mounting plate 28 having a first aperture 30 and a second aperture 32 for receiving fasteners such as bolts 33 to allow the mounting bracket to be secured to a support structure 34 such as a chassis member of the motor vehicle 10 (see also FIG. 4).

The mounting bracket 20 also includes a first leg 36 and a second leg 38 which depend from the mounting plate 28. A pivot rod 40 extends between the first leg 36 and the second leg 38 and is connected by those legs to the mounting plate 28.

The radar support bracket 22 may assume substantially any appropriate shape for receiving and holding the radar module 26. As illustrated, the radar support bracket 22 includes a first standoff or lug 42 and a second standoff or lug 44 which project from the forward face 46 of the radar support bracket. The first lug 42 includes a first aperture 48 and the second lug 44 includes a second aperture 50. When assembled, the pivot rod 40 extends through the first aperture 48 in the first lug 42 and the second aperture 50 in the second lug 44 and those apertures are sized so that the lugs and the radar support bracket 22 are rotatably received on the pivot rod.

In the illustrated embodiment, the biasing element 24 comprises a torsion spring 52 having a first end 54 and a second end 56. The torsion spring 52 is received over the pivot rod 40 (that is, extends concentrically around the pivot rod) with the first end 54 connected to the pivot rod 40 of the mounting bracket 20 and the second end 56 connected to the first lug 42 of the radar support bracket 22.

In the illustrated embodiment, the radar module 26 includes mounting tabs 58 and 60. Bolts or other fasteners 62 extend through apertures 64 in the mounting tabs 58, 60 in order to secure the radar module 26 in an operative position on the radar support bracket 22.

Reference is now made to FIG. 4. The biasing element 24/torsion spring 52 functions to bias the radar support bracket 22 into a deployed position (illustrated in full line in FIG. 4) wherein the radar module 26 held on the radar support bracket 22 is oriented to be forward facing in order to allow for proper operation detecting objects in front of the motor vehicle 10.

In the event of a low speed frontal impact, the flexible front fascia 14 may be temporarily deflected downward and rearward into contact with the radar module 26 and/or radar support bracket 22. If the radar module 26 were mounted on a rigid radar support bracket 22, the radar module 26 could be damaged by the impact force or the radar support bracket 22 could become bent causing the radar module to be oriented in a non-forward facing direction thereby rendering the radar module non-functional for adaptive cruise control and/or pre-crash braking purposes.

Advantageously, the radar support bracket 22 of the radar system 12 is not rigid. Thus, in response to a low speed frontal impact, radar support bracket 22 and the radar module 26 fixed thereto are displaced or pivoted about the pivot rod 40 into a deflected position, illustrated in phantom line in FIG. 4, thereby dissipating any impact force applied to the radar module 26 and protecting the radar support bracket 22 from stress that could lead to bending. Following application of the impact force, the flexible fascia 14 flexes back into its original position and the biasing element 24/torsion spring 52 rotates or pivots the radar support bracket 22 and the radar module 26 carried thereon back into the deployed position where the radar module 26 is maintained forward facing for proper operation of the adaptive cruise control and pre-crash braking features.

Consistent with the above description, a new and improved method of protecting a radar module 26 and a radar support bracket 22 during an impact is provided. That method may be broadly described as including the step of displacing the radar module 26 from the deployed position, illustrated in full line in FIG. 4, to the deflected position, illustrated in phantom line in FIG. 4, in response to an impact force created by the impact.

More specifically, the method may include biasing the radar support bracket 22 as well as the radar module 26 held thereon, toward the deployed position with a biasing element 24 such as the torsion spring 52. Further, the method may include the step of pivoting the radar support bracket 22 as well as the radar module 26 held thereon against the biasing element 24/torsion spring 52 in response to the impact force. Still further, the method may include the step of biasing the radar support bracket 22 as well as the radar module 26 held thereon back into the deployed position with the biasing element 24/torsion spring 52 following application of the impact force.

Still further, the method may include the step of carrying the radar module 26 on a radar support bracket 22. Further, the method may include pivotally mounting the radar support bracket 22 to a mounting bracket 20 including, more particularly, a pivot rod 40 of the mounting bracket. In addition, the method may include the step of securing the mounting bracket 20 to a support structure 34 of a motor vehicle 10.

In summary, numerous benefits are provided by the radar system 12. Advantageously, the radar system 12 incorporates a pivotally mounted radar support bracket 22 and an associated biasing element 24 that are adapted to allow the radar support bracket 22 carrying the radar module 26 to pivot or rotate out of harm's way, resulting in no permanent deformation to the radar support bracket 22 while also reducing any impact force applied to the radar module. The biasing element 24 also functions to rotate or pivot the radar support bracket 22 and radar module 26 back to the operative forward facing position to ensure proper operation of the adaptive cruise control and pre-crash braking features.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A radar system for a motor vehicle, comprising:
a mounting bracket including a pivot rod;
a radar support bracket carried on said mounting bracket and displaceable between a deployed position and a deflected position, wherein said radar support bracket includes a first lug and a second lug rotatably received on said pivot rod;
a biasing element biasing said radar support bracket toward said deployed position; and
a radar module carried on said radar support bracket.

2. A motor vehicle equipped with the radar system of claim 1.

3. The motor vehicle of claim 2, wherein said mounting bracket is fixed to a support structure of said motor vehicle.

4. The radar system of claim 1, wherein said biasing element is a torsion spring.

5. The radar system of claim 4, wherein said torsion spring is received over said pivot rod.

6. The radar system of claim 5, wherein said torsion spring has a first end connected to said mounting bracket and a second end connected to said radar support bracket.

7. The radar system of claim 5, wherein said torsion spring has a first end connected to said pivot rod and a second end connected to said first lug.

8. The radar system of claim 5, wherein said mounting bracket further includes a mounting plate, a first leg and a second leg, said first leg and said second leg extending between said mounting plate and said pivot rod.

9. A method of protecting a radar module during an impact, comprising:
displacing the radar module from a deployed position to a deflected position in response to an impact force; and
biasing said radar module toward said deployed position with a torsion spring.

10. The method of claim 9, including pivoting said radar module against said torsion spring in response to said impact force.

11. The method of claim 10, including biasing said radar module back into said deployed position with said torsion spring following application of said impact force.

12. The method of claim 11, including carrying said radar module on a radar support bracket.

13. The method of claim 12, including pivotally mounting said radar support bracket to a mounting bracket.

14. The method of claim 13, including securing said mounting bracket to a support structure of a motor vehicle.

15. A radar system for a motor vehicle, comprising:
a mounting bracket including a pivot rod;
a radar support bracket carried on said mounting bracket and displaceable between a deployed position and a deflected position;
a torsion spring biasing said radar support bracket toward said deployed position, wherein said torsion spring is received over said pivot rod; and
a radar module carried on said radar support bracket.

16. The radar system of claim 15, wherein said torsion spring has a first end connected to said mounting bracket and a second end connected to said radar support bracket.

* * * * *